(12) United States Patent
Laffey

(10) Patent No.: US 12,113,907 B2
(45) Date of Patent: Oct. 8, 2024

(54) METHODS AND SYSTEMS FOR ENROLLING DEVICE IDENTIFIERS (DevIDS) ON REDUNDANT HARDWARE

(71) Applicant: Hewlett Packard Enterprise Development LP, Houston, TX (US)

(72) Inventor: Thomas M. Laffey, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 233 days.

(21) Appl. No.: 17/808,411

(22) Filed: Jun. 23, 2022

(65) Prior Publication Data

US 2022/0329435 A1    Oct. 13, 2022

Related U.S. Application Data

(63) Continuation-in-part of application No. 16/724,144, filed on Dec. 20, 2019, now Pat. No. 11,405,222.
(Continued)

(51) Int. Cl.
*H04L 9/32* (2006.01)
*G06F 21/73* (2013.01)
*H04L 9/08* (2006.01)

(52) U.S. Cl.
CPC ............ *H04L 9/3234* (2013.01); *G06F 21/73* (2013.01); *H04L 9/083* (2013.01); *H04L 9/3265* (2013.01); *H04L 2209/127* (2013.01)

(58) Field of Classification Search
CPC ..... H04L 9/083; H04L 9/3234; H04L 9/3247; H04L 9/3265; H04L 9/3268; H04L 2209/127; G06F 21/73
See application file for complete search history.

(56) References Cited

U.S. PATENT DOCUMENTS

| 7,664,965 B2 | 2/2010 | Bade et al. |
| 7,733,804 B2 | 6/2010 | Hardjono et al. |

(Continued)

OTHER PUBLICATIONS

Chen et al., "cTPM: A Cloud TPM for Cross-Device Trusted Applications", (Research Paper), 11th USENIX Symposium on Networked Systems Design and Implementation (NSDI '14), Apr. 2-4, 2014, 16 Pgs.

(Continued)

*Primary Examiner* — Minh Dinh
(74) *Attorney, Agent, or Firm* — Hewlett Packard Enterprise Patent Department

(57) ABSTRACT

Methods and systems for implementing DevID enrollment for hardware redundant Trust Platform Modules (TPMs), are described. A system can include hardware redundancy for management modules, and for TPMs that correspond to each management module. Accordingly, a product can have a dual-TPM configuration, where both modules are associated with the same product. Further, a process that particularly considers the presence of dual-TPMs for creating, issuing, and enrolling DevID certificates is described. The process issues and maintains DevID certificates for each TPM by synchronizing dual sessions that correspond to each TPM. Also, the process accounts for duplicate identification data, for example allowing the certificate authority (CA) to sign certificates for dual-TPMs linked to the same chassis number. The process can include performing validation checks, rendezvous points, and locks to ensure that DevID certificates are successfully issued for each of the dual-TPMs, respectively.

20 Claims, 6 Drawing Sheets

Related U.S. Application Data

(60) Provisional application No. 62/783,245, filed on Dec. 21, 2018.

(56) References Cited

U.S. PATENT DOCUMENTS

| | | |
|---|---|---|
| 8,385,551 B2 | 2/2013 | Pourzandi et al. |
| 8,650,394 B2 | 2/2014 | Vilhuber et al. |
| 2005/0163317 A1 | 7/2005 | Angelo et al. |
| 2007/0016801 A1 | 1/2007 | Bade et al. |
| 2008/0215910 A1 | 9/2008 | Gabriel et al. |
| 2016/0344559 A1 | 11/2016 | Ma et al. |
| 2017/0201383 A1 | 7/2017 | Kim |
| 2017/0366537 A1 | 12/2017 | Bose et al. |
| 2018/0205722 A1 | 7/2018 | Getschmann et al. |
| 2019/0228157 A1 | 7/2019 | Tang et al. |
| 2021/0021422 A1 | 1/2021 | Schlameuss et al. |

OTHER PUBLICATIONS

TCG, "TCG Infrastructure WG—TPM Keys for Platform Identity for TPM 1.2", Aug. 21, 2015, 68 pages.

"TPM Keys for Platform DevID for " Specification Version 0.7 Revision 3, Nov. 7, 2018, 59 pages.

Gutmann, P. et al., Simple Certificate Enrolment Protocol, (Research Paper), Sep. 20, 2020, 42 Pgs.

Watsen et al., "Zero Touch Provisioning for Networking Devices draft-ietf-netconf-zerotouch-24", Aug. 20, 2018, 63 pages.

METHODS AND SYSTEMS FOR ENROLLING DEVICE IDENTIFIERS (DevIDS) ON REDUNDANT HARDWARE

RELATED APPLICATIONS

This application claims the benefit of U.S. Provisional Patent Application No. 62/783,245, filed on Dec. 21, 2018, the contents of which is incorporated herein by reference in its entirety.

DESCRIPTION OF RELATED ART

As security continues to be an underlying concern in distributed networked communications, many network-based applications (e.g., Zero Touch Provisioning, Secure Management, and Secure Supply Chain) require that a networked device have a unique cryptographic identifier that can be used for authenticating itself during communication. Features of these network-based applications can depend on remotely identifying, in an un-spoofable manner, the identity of the connected device. A cloud-based management service, for instance, may require that an identity of the device can be positively and verifiably obtained. Accordingly, some existing networking standards, such as IEEE 802. AR, include a Device Identity (DevID) which can be a factory installed unique identifier for a network device, such as a network switch. In accordance with the standards, a DevID is a digital certificate, signed by the manufacturer, that contains a product identity and a public key such that the identity is not spoofable or corruptible over the life of the product.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

In many legacy network switch systems, the chassis includes a single TPM (having DevID certificates to identify the product), even in instances when a redundant management module is installed. That is, a bus may be shared between the management modules that interconnect with the shared TPM and a persistent memory (where the DevID keys and certificates are stored). As a result, even if there is a redundant memory module, the lack of redundancy with respect to the TPMs lends itself to a higher potential of error, failure, and poor recovery of the system (e.g., single point failure). Accordingly, to address such drawbacks, the system disclosed herein leverages hardware redundancy for both the management modules and the TPMs. However, with the benefits of utilizing a dual-TPM implementation, enrollment and creating of unique certificates for peer TPMS, effectively having the same device identities, presents a new set of obstacles. As alluded to above, due to the shared TPM configuration of most legacy systems, the related certificate enrollment approaches require that each product directly correspond to a single DevID at a given time. However, the dual-TPM implementation, as disclosed herein, requires a matching DevID for each of the two TPMs, each having the same identifiers. Consequently, a distinct enrollment process that is particularly designed to account for dual-TPMs (and dual-IDs) is described herein.

Figure 1:
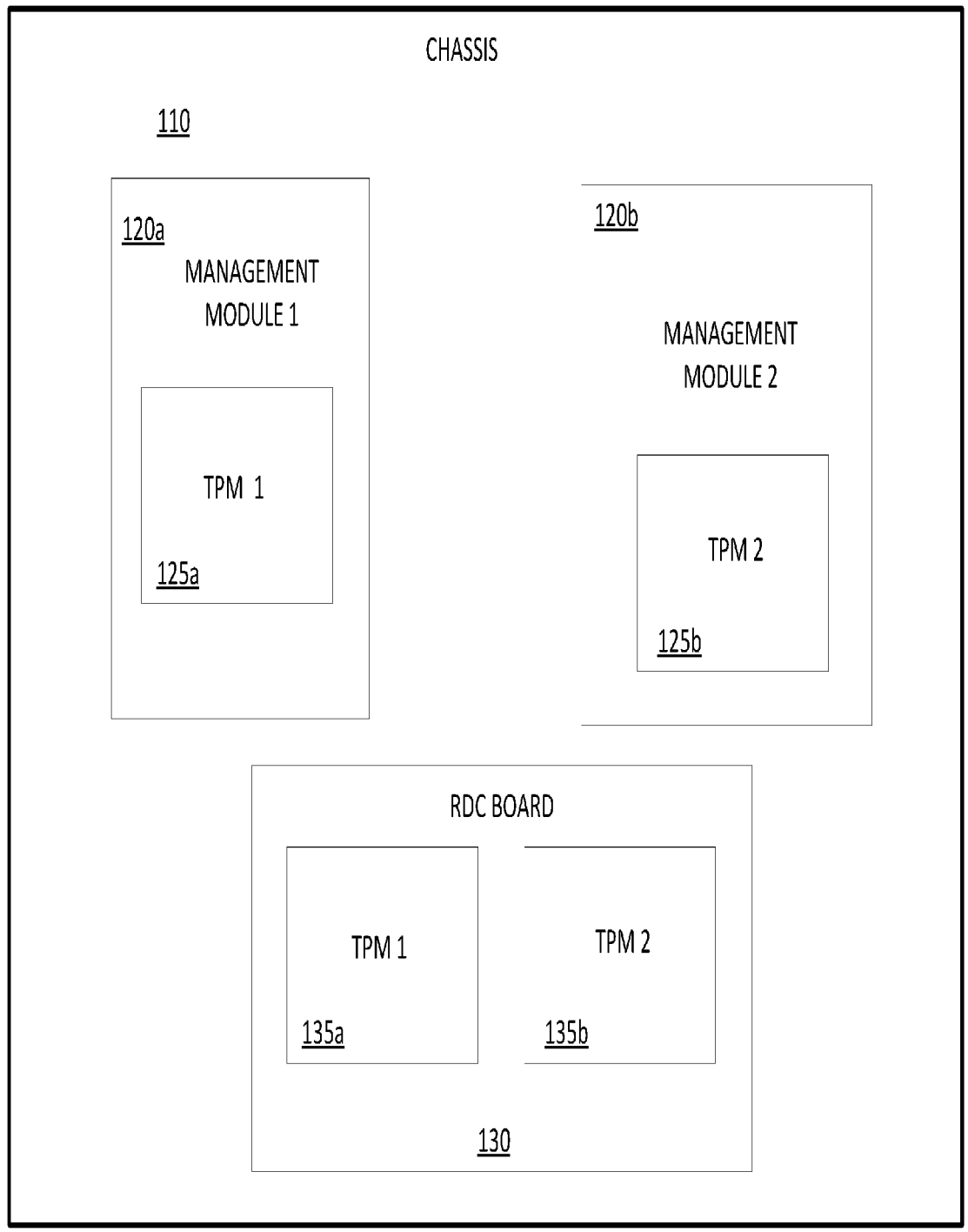
FIG. 1 depicts an example of a system implementing hardware redundancy for management modules, and Trusted Platform Modules (TPMs), according to some embodiments.

FIG. 1 is a diagram of an example of a network switch system 100, in accordance with the embodiments. For example, the system can be a network switch backplane. Although the system 100 is described as a network switch system for purposes of discussion, it should be appreciated that the system 100 is not limited to the embodiment of a network switch system. For example, the system 100 can be implemented as other network devices that can include similar structure and/or function as the system 100, for example routers, servers, and the like.

The network switch system 100 can generally be described as having the functionality of a network switch, facilitating the flow of incoming data being received (at an input port) from a network device and forwarded (to an output port) to a destination network device connected thereto, thereby supporting network connectivity. In some cases, network switch system 100 can be a core network switch, serving as the backbone of a network in high-density environments such as campus-aggregation and data-center networks, and capable of various functions, including, but not limited to: connecting either aggregation or edge network switches to each other; connecting user or device edge networks to data center networks; and connecting enterprise local area networks (LANs) to the routers that connect them to the Internet.

FIG. 1 illustrates that the hardware configuration of the network switch system 100 can be a modular system. FIG. 1 illustrates that the network switch system 100 is configured such that a network switch chassis 110 can include management modules 120a, 125b, TPMs 125a, 125b, and a Rear Display Card (RDC) board 130 mounted thereto. Typically, in manufacturing, the RDC board 130 is mounted to the chassis 110, and stickers are affixed to the chassis 110 that correspond to a network based MAC ID, and the serial number for the chassis 110. Then, the management modules 120a, 120b may be installed and booted.

As a general description, the network switch chassis 110 can be a rigid structure that can be a protective and mountable housing for the components of the network switch 100. For instance, the network switch chassis 110 can be constructed of sheet-metal, serving to enclose network switch components, such as the management modules 120, 120b, that are installed therein. As an example, a network switch chassis 110 used in the system 100 can have the dimensions of approximately 17 inches in width, approximately 14 inches in depth, and approximately 6 inches in height.

As seen in FIG. 1, the system 100 is configured for hardware redundancy of the management modules, including a management module 1 120a, and a management module 120b. As an example, management module 120a may be installed in the chassis 110 and configured to function primarily during operation of the network switch. Thus, management module 120b can be co-installed on the same chassis 110, and configured to function as a back-up being dedicated for hardware redundancy. The chassis 110 that is shipped from the factory includes a chassis certificate and keys associated with that chassis certificate. Typically, the chassis is shipped from the factory without the management modules 120a, 120b. Until the management modules 120a, 120b are purchased and installed by the customer, the redundancy features of the present invention are not available. Thus, before at least one of the management modules 120a, 120b are installed and operable, the devices have no chassis identification information available over the network. Although a chassis 110 is thought of as the mechanical surrounding of the network device, for purposes of discussion the term may sometimes be used instead of the term "network device."

Further, as alluded to above, network switch system 100 is particularly structured to mirror the redundancy of the management modules 120a, 120b by implementing hardware redundancy of the TPMs. In the illustrated example, boards for the management modules 120a, 125b each have a TPM, namely TPM 1 125a and TPM 2 125b. Additionally, the RDC board 130 has two TPMs installed thereon, shown as TPM 1 135a, and TPM 2 135b. As seen in FIG. 1, chassis 110 can have TPM 1 135a, and TPM 2 135b, also referred to herein as dual-TPMs (or peer TPMs) installed thereon. With the dual-TPMs 135a, 135b in the chassis 110, each TPM can individually represent the identity of the chassis 110 to each of their respectively connected management modules 120a, 120b. In the example, management module 120a is particularly associated with TPM 1 135a, and management module 120b is particularly associated with TPM 2 135b.

As described herein, each of the TPMs 135a, 135b provide protection for the cryptographic identity information, such as signing keys (e.g., storage for the data can be an external EEPROM). The redundant TPM 2 135a can have the option to use "primary" keys that are regenerated on each boot and remain with the TPM. The TPMs 135a, 135b can be commercially available devices that perform some cryptographic operations using cryptographic key data that is associated with TPM devices 135a, 135b. The identity has to be installed on the element directly corresponding to the identity it represents, and thus the chassis identity must be on the chassis and cannot be directly on the management modules 120a, 120b (e.g., the management modules are removable, and can be plugged into another chassis). In some cases, each of the TPMs 135a, 135b can be a security chip installed on the RDC board 130 of the chassis 110 to be used by a respective one of the management modules 120a, 120b. For example, in operation, when management module 120a is installed in the chassis 110, it has access to its dedicated TPM 1 135a and the DevID that is in the chassis (allowing associated software to represent the chassis 110 on which the management module 120a is installed). Referring back to the example, where management module 120b is designated as the back-up, or redundant module, its corresponding TPM 2 135b is similarly considered the back-up, or redundant TPM.

Thus, by having a dual-TPM configuration, if management module 120a with access to the TPM 135a should fail or become inaccessible due to some other hardware failure, the cryptographic information is not completely unavailable. By failing-over to its peer, namely management module 120b with access to TPM 135b, the system 100 can still make use of the keys to perform cryptographic operations within the TPM 135b. However, in order for the peer TPM 2 135b to function in the same manner as the primary TPM 1 135a, then redundant TPM 2 135b would also need access to the required cryptographic data, such as DevID certificates that contain the same chassis identity. In other words, data cannot be transferred from TPM 135a to TPM 135b, and each of the TPMs must be issued its own certificate In a specific example, the management modules 120a, 120b are prevented from directly communicating with each other. Further, each of the management modules 120a, 120b can independently connect to a remote device, such as a factory test workstation, which controls each of the module's programming of their respective side of the RDC board 130 with the device identity information. Accordingly, rather than transferring data between the dual-TPMs 135a, 135b (vis-à-vis the respective management modules 120a, 120b), both of the dual-TPMs 135a, 135b would require similar installation and enrollment actions. Consequently, as previously described, a distinct operation associated with a Certificate Authority (CA) enrolling certificates for each of these dual-TPMs 135a, 135b is also employed.

Figure 2:
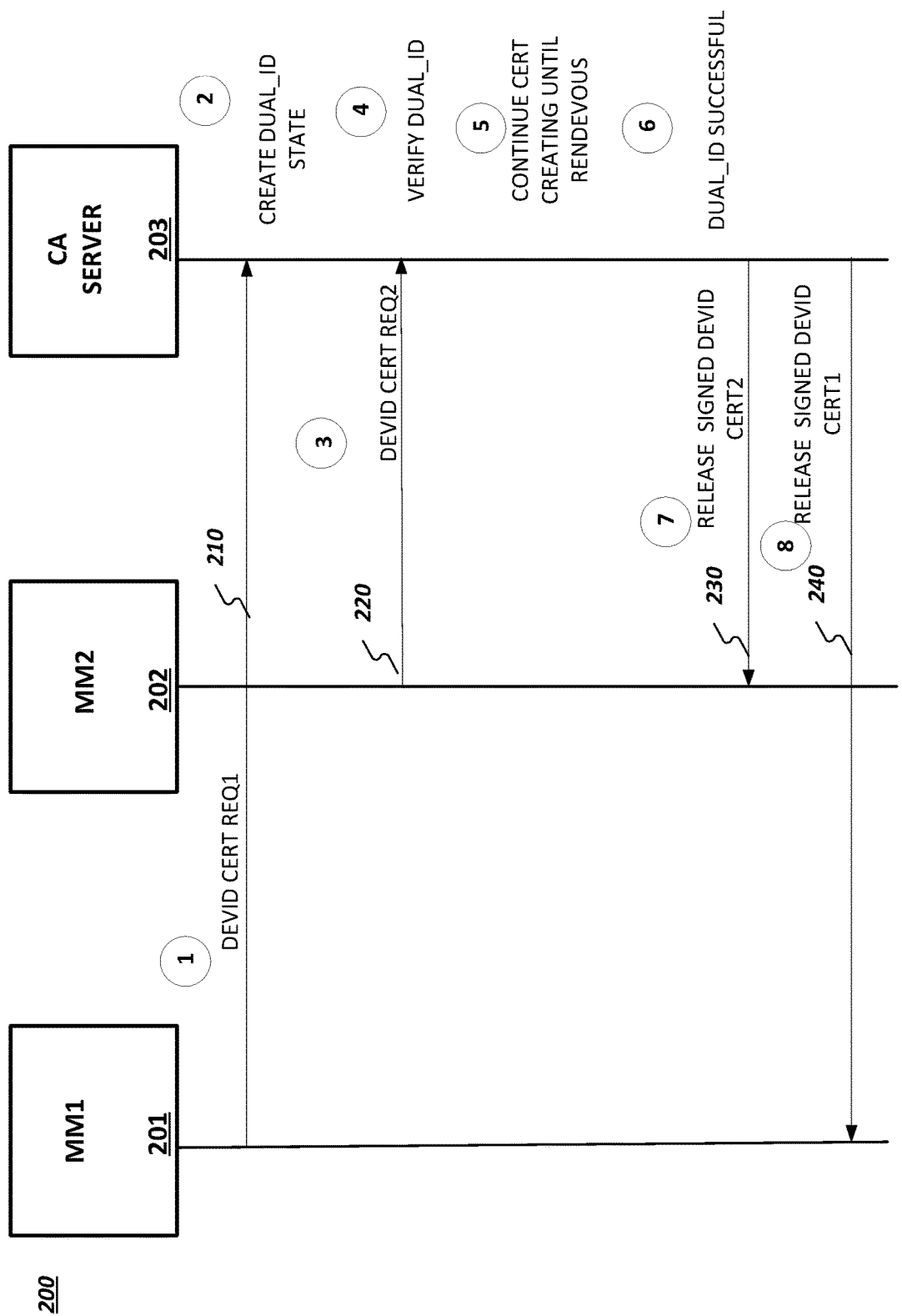
FIG. 2 illustrates an example of a message flow for creating DevID certificates for dual-TPMs, according to some embodiments.

To overcome the aforementioned challenges, FIG. 2 illustrates an example of a message flow 200 for an exchange between redundant management modules, according the disclosed embodiments, and a CA that is responsible for issuing certificates for the modules. In this example, both of the management modules 201, 202 are allowed to independently attempt to create its own set of chassis DevID certificates. In the illustrated example, the process 200 can begin with a first management module, namely management module 201, communicating its request to create DevID certificates. This DevID certificate request is transmitted to a device associated with a certificate authority (CA), shown as CA server 203

Subsequently, flow 220 involves the second management module, namely module 202, communicating its request to create DevID certificates to the CA server 203. FIG. 2 serves to illustrate that these requests are communicated by the management modules 201, 202 (and received by the CA server 203) independently of each other. As such, the CA server 203 can receive these requests from both modules, shown in flows 210 and 220, substantially in parallel. Furthermore, due to the management modules 201, 202 being co-resident on the same chassis (as shown in FIG. 1) some of the identifying data that is communicated within these separate requests, will be identical. For example, the management modules 201, 202 have the same serial numbers, but the modules use different TPM information and different keys. As previously described, such an attempt to issue the same active certificates to two different TPMs, (vis-à-vis the respective management modules 201, 202) would be forbidden by the policies of legacy CA systems. For instance, using existing certificate enrollment schemes, the first management module to request a chassis DevID from the CA would have a certificate issued, while the management module transmitting the later request would cause the first to be revoked by the CA, as it appears to the CA to be preprocessing the same chassis. Accordingly, in the dual-TPM configuration disclosed herein, legacy CA system and enrollment approaches would be governed completely by a time race condition.

To eliminate such a scenario, the disclosed enrollment approach includes leveraging an indicator that the transaction is related to a dual-TPM configuration (also referred to herein as dual-ID enrollment). That is, in flow 210, the DevID certificate request communicated by the management module 201 includes a dual-ID indicator, signaling to the CA server 203 that the TPM for the management module 201 has a peer (e.g., another TPM that is co-installed on the same chassis), and that the corresponding DevID certificate request in flow 220 can be the related (and similar) request from this peer. Thus, in response to receiving this dual-ID indicator (with the DevID certificate request) from the management module 201 in flow 210, the CA server 203 can determine that this request is related to a dual-ID and create a dual-ID state. For example, the dual-ID state, causes the CA server 203 to expect a second (and seemingly duplicate) transaction. In response to initiating this dual-ID state, the CA server 203 can then implement mechanisms and protocols to account for both transactions from the management modules 201, 202 (for the peer-TPMs). With dual-ID transactions, the CA server 203 allows the otherwise independent transactions from both of the management modules 201, 202 to be linked to each other, and having the resulting certificates co-verified, during the course of certificate enrollment.

Next, in response to receiving the second DevID request from the management module 202, the CA server 203 can receive related dual-ID information in the request from flow 220. That is, dual-ID data from the second request serves as the indication to the CA server 203 that this is a peer-TPM to a previously seen device, and that this transaction is linked to the previous transaction from that particular device. Accordingly, in response to the CA server 203 receiving the additional dual-ID indicator (with the second DevID certificate request) from the management module 202 in flow 220, the CA server can verify that this is the peer-TPM from the same device, and that this is a second (and seemingly duplicate) transaction. The management modules 201, 202 have an awareness of whether it is the first (or second) device to send its information to the CA server 203, but the CA server 203 is not aware of which of the management modules 201, 202 will be first, until it receives the first request in flow 210.

After verifying (and linking) the dual-ID states of the received DevIDs certification requests from both management modules 201, 202, the CA server 203 can allow the certificate creation and signing procedure to continue for both TPMs up to a defined rendezvous point. For example, once the rendezvous point is reached, the CA server 203 can determine whether certificates were successfully created and signed for both of the independent requests. As a result, for example if both transactions of the dual-ID enrollment are successful, then both responses are respectively returned to the corresponding management modules 201, 202. As seen in FIG. 2, flow 230 includes the CA server 203 communicating a reply message that issues the signed DevID certificate to management module 202 in response to the request transmitted in flow 220. Thereafter, in flow 240, the CA server 203 can communicate another reply message that issues the signed DevID certificate to management module 201, in response to the request transmitted in flow 210.

According to the embodiments, the disclosed dual-ID enrollment techniques allow the CA to implement mechanisms that are particularly designed to account for dual-IDs during the certificate creation process, such as rendezvous schemes, unique dual-ID specific indicators, state locks, and the like. As such, a CA can leverage this enrollment scheme to appropriately issue active DevID certificates for both TPMs in the system concurrently as needed to support TPM redundancy in a manner that eliminates contention, unintended revocation, or weakened security.

Figure 3:
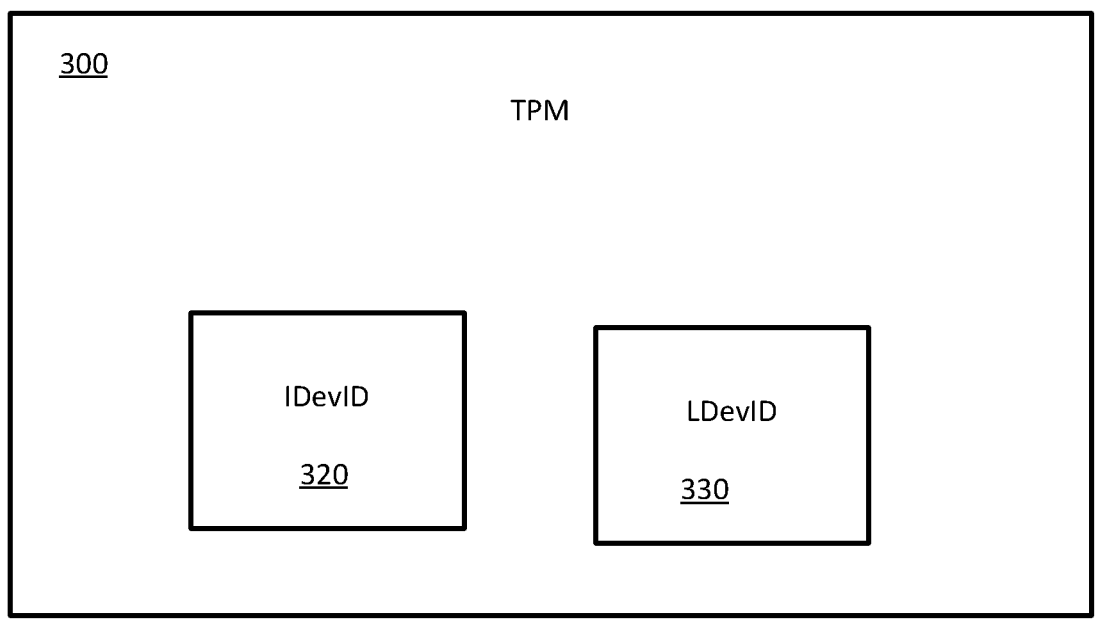
FIG. 3 illustrates an example of an TPM including device identifiers for TPM redundancy, according to some embodiments.

In FIG. 3, an example of a TPM 300 including device identifiers for TPM redundancy is shown. In particular, TPM 300 is shown to include an initial device ID (IDevID) 320 and a local device ID (LDevID) 330. The TPM 300 can implement these identifiers, IDevID 320 and LDevID 330, in accordance with the IEEE 802.1AR standard. For instance, the IDevID 320 can be a factory installed device identity, and the LDevID 330 can be a customer installed device identity. In some cases, certificates are specified for each these identifiers.

Figure 4A:
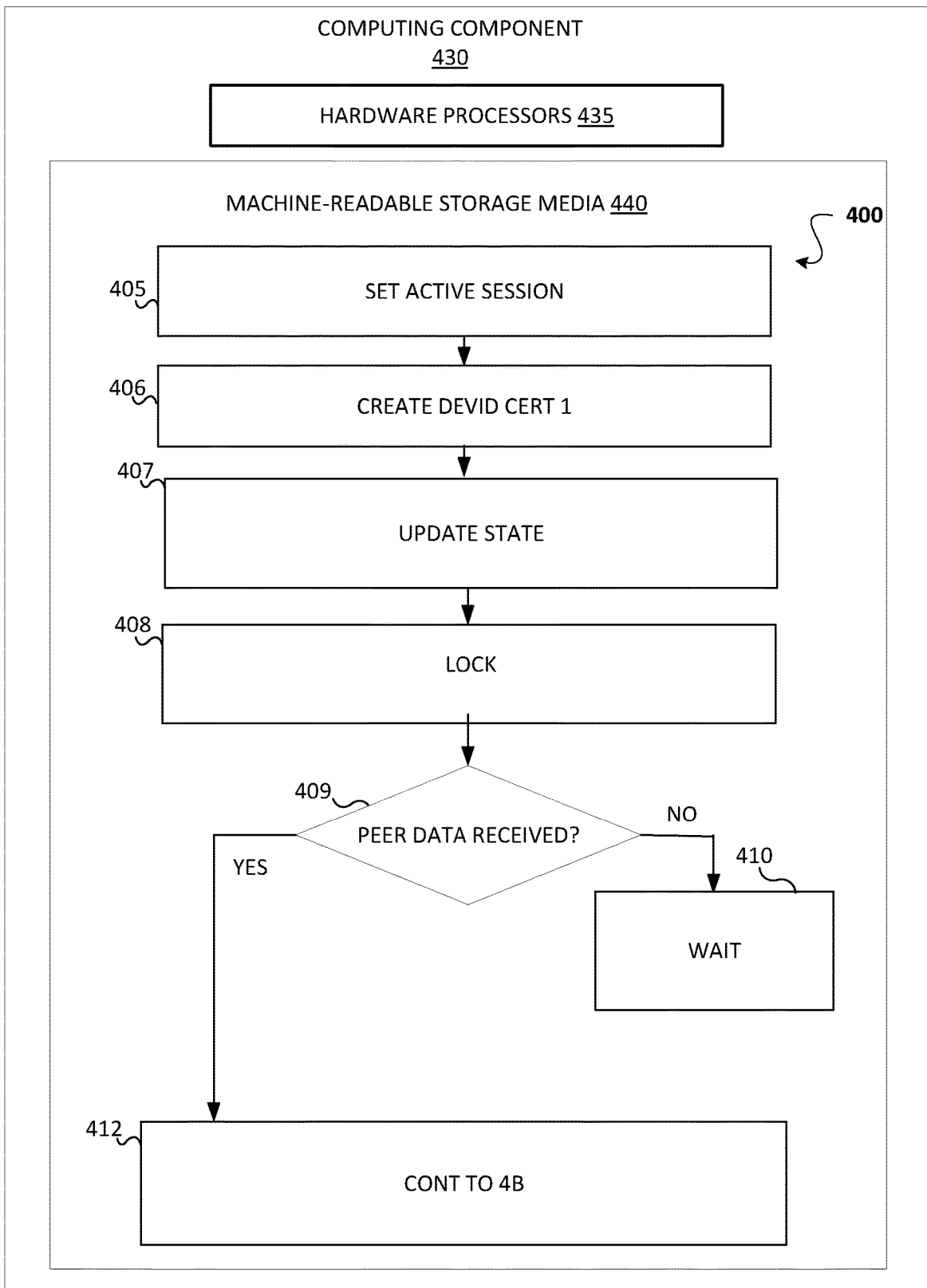
FIGS. 4A-4B are operational flow diagrams illustrating an example of a process for implementing DevID certificate creation and enrollment for dual-TPMs, according to some embodiments.
Figure 4B:
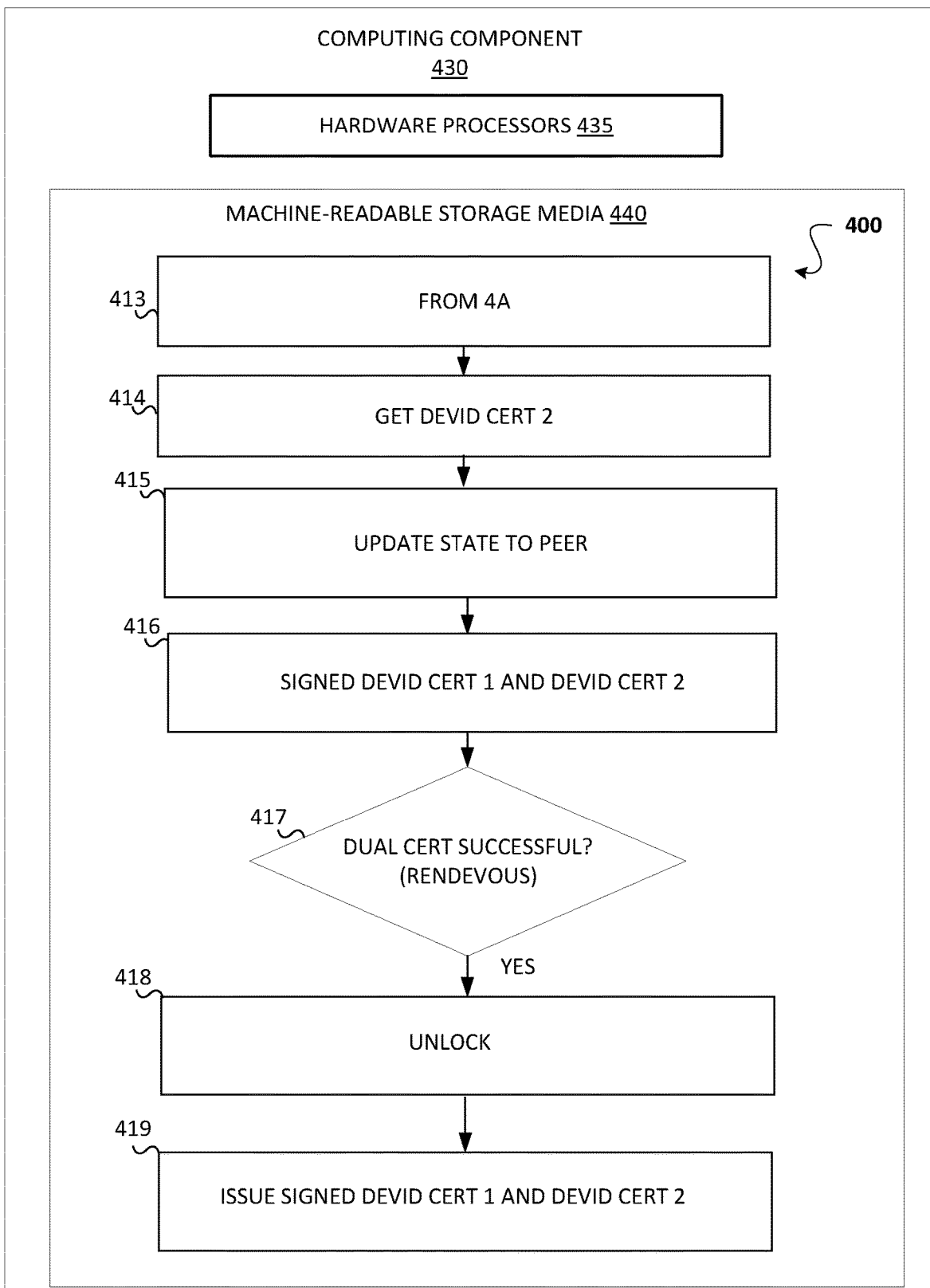

Referring now to FIGS. 4A-4B, a process 400 that implements the disclosed dual-ID enrollment process, as generally described with reference to FIG. 2, is described in greater detail. In detail, FIGS. 4A-4B illustrate an example of a process 400 that may be implemented by the CA in order to successfully create, sign, and issue DevID certificates to dual-TPMs. In a system having hardware redundancy for management modules, the associated enrollment process 400 must be able to issue and maintain matching DevID certificates across two physically separate (but logically equivalent) computing systems. That is, the same identity must be issued by two TPMs, where each individual TPM is capable of representing the identity of the same chassis.

According to an embodiment of the systems and methods described herein, the process can be performed by the CA server (shown in FIG. 2). However, in some cases, at least portion of the process 400 can be performed by another back-end device associated with the CA, such as a Registration Authority (RA) server. Accordingly, process 400 is illustrated as a series of executable operations stored in a machine-readable storage media 440, and being performed by hardware processors 435 in a computing component 430, which can be the CA server, as described above. Hardware processors 435 execute the operations of process 400, thereby implementing the disclosed dual-ID enrollment techniques described herein As alluded to above, the process 400 involves creating DevID certificates for each of the dual-TPMs that can be installed on the same chassis (as shown in FIG. 1), or other network device. The process can begin at operation 405, where the CA sets an active session for creating an DevID certificate for a TPM (corresponding to a requesting management module). In some cases, operation 405 involves the CA generating a reply message (e.g., DID_reply) to a management module, in response to receiving a request (DID_request). The request and reply messages can be communicated in the exchange between a factory workstation and the CA, for example.

The CA server can include a session management mechanism, which provides the capability for the CA to hold data from the different transactions, store session states, and the like. In the exchange, as discussed above, the management module can send a request, which the CA can store by using the session managing. However, it should be appreciated that the session manager can hold data corresponding to multiple transactions, not limited to the dual-TPM transactions. Thus, the CA must be capable of linking the sessions that correspond to the peer TPMs that are both co-resident on the same device. Accordingly, setting an active state in operation 405 can include allocating session memory, marking a session active, initiating certificate creation, updating these states in session memory, and other actions that are related to maintaining the first session (of two session) for a dual-ID enrollment.

Next, at operation 406, the CA can create the DevID certificate corresponding to this first active session (received by the CA). Then, at operation 407, the state can be updated, allowing the CA to be aware that a first session for a dual-ID has been received, and the corresponding first certificate has been created.

Once the CA has updated the state of the session, the CA is aware that a dual-ID enrollment has become active, and can begin to set the specialized mechanisms that are designed to support issuing certificates for peer TPMs. As such, the CA locks a thread associated with the first session in operation 408. By locking the thread at this point in the process 400, the CA creates a synchronization point, allowing an expected second session (not yet received, in this example) to be linked to this currently active session. For example, once the thread is locked, the first thread is waiting for the second thread to rendezvous prior to completion. It should be understood that the steps of process 400 is an example, and in some cases, each of the first and second threads can communicate their own request to the CA server. In other cases, the second thread may make the request to the CA server for both threads and update peer state once completed. Thus there are various ways to perform dividing the work between the threads, and various mechanism that can be used to create the rendezvous, in accordance with the embodiments.

In order for synchronization to occur, there must be a mechanism that can detect that the second session has yet to occur (e.g., still waiting). Thus, the disclosed CA has the unique capability to leverage the same DevID data to determine that a subsequent session corresponds to a previous session. Accordingly, process 400 performs a comparison at operation 409, to determine whether any subsequent session that it has received is related to a peer TPM, or the second session of the dual-ID enrollment. If the CA does not detect a linking session, in response to the comparison in operation 409, then the session is not the expected second session of the dual-ID enrollment. Thus, the process 400 waits, at operation 410, for the peer at this synchronization point, and the thread for the first session remains locked. According to an embodiment, the CA may wait for an amount of timeup to a maximum threshold, for example 120 seconds. It should be appreciated that in some embodiments, the lock at operation 408 can occur at the "WAIT" during operation 410, with the unlock at operation 418 (shown in FIG. 4B) occurring when the second thread reaches the comparison point during operation 409 (or when the lock times out).

Conversely, if it is determined that this is the second session in the dual-ID (from the peer TPM in the dual-TPM configuration), the process 400 continues to 412, which leads to FIG. 4B.

In FIG. 4B, the process 400 proceeds from operation 413 to operation 414. At operation 414, the CA can get any DevID certificates created for the peer TPM (in response to the request of the second session). In some cases, operation 414 can involve assembling the created certificates that correspond to each individual TPM.

Next, in operation 415, the status can be updated to peer session. Thus, the CA is now aware that the expected second session for the dual-ID enrollment has become active. Subsequently, specialized rendezvous mechanisms can be implemented.

Thereafter, in response to both certificates being created (and assembled), both certificates (e.g., DevID CERT 1 and DevID CERT 2) are signed at operation 416. In some cases, for example when the process 400 is being performed by the RA server, operation 416 can involve sending a signing request from the RA to the CA server.

Next, the process 400 moves to operation 417, where the CA performs a rendezvous condition for both of the sessions of the dual-ID enrollment. That is, a check is performed in operation 417 to determine whether certificates for both the first session and the second session were successfully completed. In some cases, in order for a DevID certificate to be considered successfully issued (or complete), the certificate must be created, signed, and stored in a database associated with the CA. This database, implements certain policies in order to ensure that certificates are not improperly issued. For example, the database may track data such as product assignment, the coupling of a printed circuit board (PCB) and its associated TPM to a particular chassis serial number, and other association information. For supporting the dual-TPM configuration of the embodiments, the database can allow two TPMs to be associated with the same chassis serial number (where only one TPM reference is permitted in legacy systems). Thus, receiving two TPM numbers with the same chassis number, for instance, would not create an error in process 400. In comparison to legacy system, such as an event would cause policies to be violated, resulting in revocation of the certificate.

Moreover, operation 417 can involve scanning the database twice with respect to the issued certificates for a TPM. For example, during a dual-ID enrollment, the CA can check the database once with a hash of an identifier for TPM 1, and then again using the hash of an identifier of the peer TPM 2. When active records are located for both TPMs in the database, operation 417 may determine that the DevID records were successfully issued for the dual-TPMs.

In the event that the certificates have been created, signed, and stored for both sessions ("Yes") of the dual-ID, then the rendezvous can be considered successful. At operation 418, both sessions have active certificates that have been successfully issued by the CA (e.g., rendezvous), and thus, the thread is unlocked. Therefore, the process 400 proceeds to operation 419 where the reply from the CA is allowed to complete for the respective session. Operation 419 can include the DevID certificates for the dual-TPMs, signed by the remote CA, to be released to each TPM (vis-à-vis the management modules).

Referring back to operation 417, in the event that the rendezvous fails, it can be assumed that an error has occurred and the process 400 exits (not shown). In other words, the dual-ID enrollment requires both of the TPMs to be successfully issued their respective DevID certificate. If the certificate of a TPM is revoked during the certification process, the peer TPM is also revoked. In some cases, this error is logged.

Figure 5:
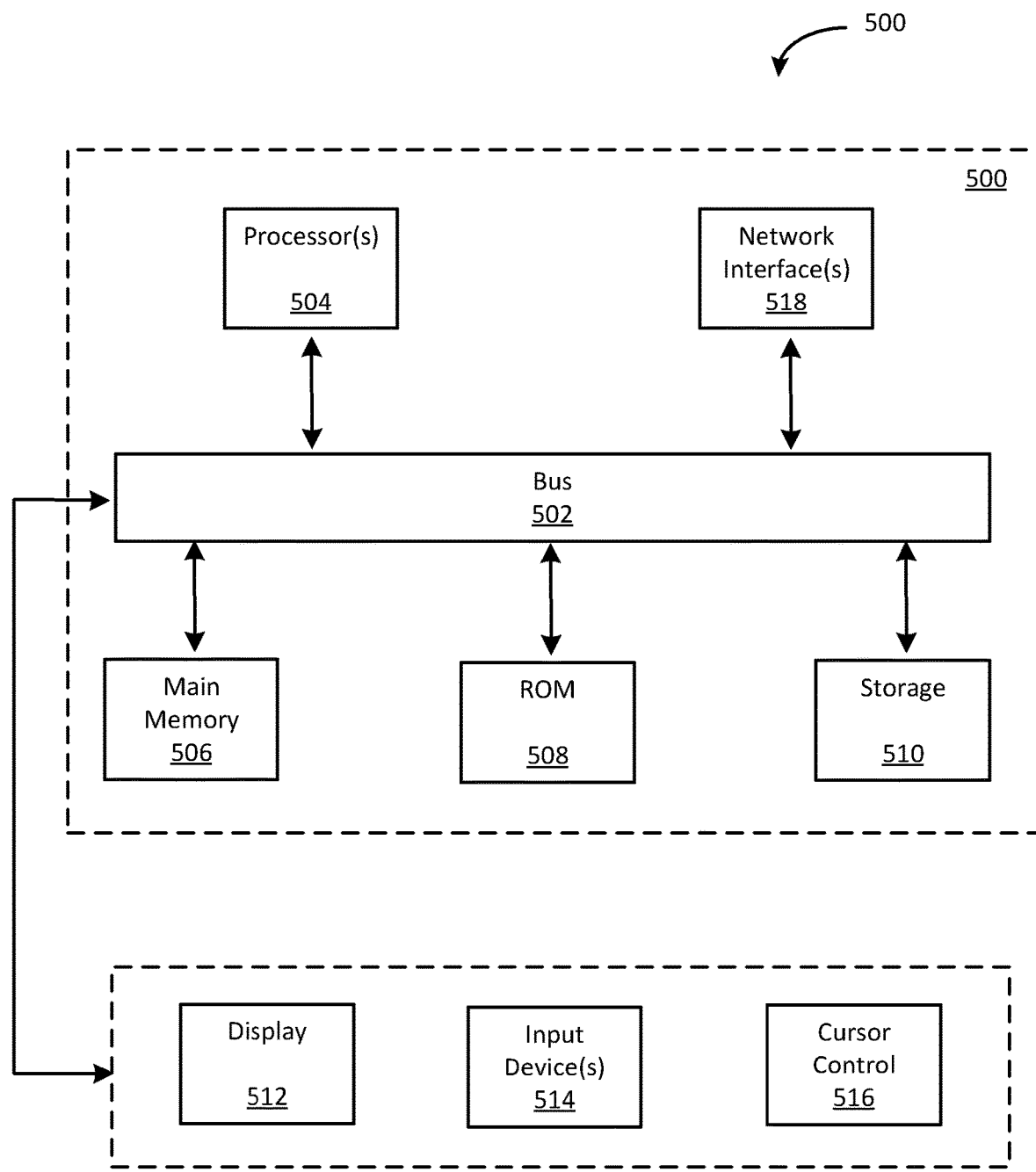
FIG. 5 illustrates an example computer system that may be used in implementing a certificate authority (CA) to perform enrollment for dual-TPMs, relating to the embodiments of the disclosed technology.

FIG. 5 depicts a block diagram of an example computer system 500 in which the disclosed user dual-ID enrollment techniques may be implemented. Furthermore, it should be appreciated that although the various instructions are illustrated as being co-located within a single processing unit, such as CA server, in implementations in which processor(s) includes multiple processing units, one or more instructions may be executed remotely from the other instructions.

The computer system 500 includes a bus 502 or other communication mechanism for communicating information, one or more hardware processors 504 coupled with bus 512 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 716, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 706 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 516. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 710, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving, at a server from a first management module in a network device that comprises redundant management modules including the first management module and a second management module, a first request for a first security certificate, wherein the first request comprises an indication that another transaction for creating another security certificate is expected from another management module of the redundant management modules;
   in response to receiving the first request, initiating, at the server responsive to the indication, a state that awaits another request for a security certificate from another management module of the redundant management modules;
   while the server is in the state, receiving, at the server from the second management module, a second request for a second security certificate;
   determining, by the server, whether a transaction for the second request is related to a transaction for the first request; and
   in response to determining that the transaction for the second request is related to the transaction for the first request, sending, by the server, the first security certificate to the first management module, and the second security certificate to the second management module.

2. The method of claim 1, wherein the redundant management modules are to use dual trusted platform modules (TPMs) in the network device.

3. The method of claim 1, wherein the second request, references the first request.

4. The method of claim 1, further comprising:
   determining whether the first security certificate for the first request was successfully signed; and
   in response to determining that the first security certificate was successfully signed, determining whether the second security certificate for the second request was successfully signed.

5. The method of claim 4, further comprising:
   in response to determining that the second security certificate was successfully signed, sending the signed first security certificate to the first management module, and sending the signed second security certificate to the second management module.

6. The method of claim 1, wherein the first security certificate is for a first TPM in the network device, and the second security certificate is for a second TPM in the network device.

7. The method of claim 1, wherein both the first security certificate and the second security certificate comprise a same chassis identity for the network device.

8. The method of claim 7, wherein the same chassis identity comprises a same chassis serial number.

9. The method of claim 7, wherein the first security certificate comprises a first key for a cryptographic operation of the first management module, and the second security certificate comprises a second key for a cryptographic operation of the second management module.

10. The method of claim 1, comprising:
while the server is in the state, receiving, at the server, a third request for a security certificate;
determining, by the server, whether a transaction for the third request is related to the transaction for the first request; and
in response to determining that the transaction for the third request is unrelated to the transaction for the first request, continuing to stay in the state.

11. A non-transitory machine-readable storage medium comprising instructions that upon execution cause a server to:
receive, at the server from a first management module in a network device that comprises redundant management modules including the first management module and a second management module, a first request for a first security certificate, wherein the first request comprises an indication that another transaction for creating another security certificate is expected from another management module of the redundant management modules;
in response to receiving the first request, initiate, in response to the indication, a state that awaits another request for a security certificate from another management module of the redundant management modules;
while the server is in the state, receive, at the server from the second management module, a second request for a second security certificate;
determine whether a transaction for the second request is related to a transaction for the first request; and
in response to determining that the transaction for the second request is related to the transaction for the first request, send, from the server, the first security certificate to the first management module, and the second security certificate to the second management module.

12. The non-transitory machine-readable storage medium of claim 11, wherein the first security certificate is a first device identifier DevID) certificate, and the second security certificate is a second DevID certificate.

13. The non-transitory machine-readable storage medium of claim 1, wherein the redundant management modules are to use dual trusted platform modules (TPMs) in the network device, and wherein the first security certificate is for a first TPM in the network device, and the second security certificate is for a second TPM in the network device.

14. The non-transitory machine-readable storage medium of claim 11, wherein the instructions upon execution cause the server further to:
create, at the server, the first security certificate and the second security certificate;
request signing of the first security certificate and the second security certificate; and
receive a response based on the request.

15. The non-transitory machine-readable storage medium of claim 14, wherein the response is from a remote certificate authority (CA).

16. The non-transitory machine-readable storage medium of claim 15, wherein the instructions upon execution cause the server further to:
in response to an indication that the first and second security certificates are in error or were not successfully signed by the remote CA, failing the first request and the second request and returning an indication of failure.

17. The non-transitory machine-readable storage medium of claim 16, wherein the instructions upon execution cause the server further to:
store the first security certificate and the second security certificate in a database.

18. The non-transitory machine-readable storage medium of claim 11, wherein both the first security certificate and the second security certificate comprise a same chassis identity for the network device.

19. A system comprising:
a processor; and
a non-transitory storage medium storing instructions executable on the processor to:
receive, at the system from a first management module in a network device that comprises redundant management modules including the first management module and a second management module, a first request for a first security certificate, wherein the first request comprises an indication that another transaction for creating another security certificate is expected from another management module of the redundant management modules;
in response to receiving the first request, initiate, in response to the indication, a state that awaits another request for a security certificate from another management module of the redundant management modules;
while the system is in the state, receive, at the system from the second management module, a second request for a second security certificate;
determine whether a transaction for the second request is related to a transaction for the first request; and
in response to determining that the transaction for the second request is related to the transaction for the first request, send, from the system, the first security certificate to the first management module, and the second security certificate to the second management module.

20. The system of claim 19, wherein the redundant management modules are to use dual trusted platform modules (TPMs) in the network device, and wherein the first security certificate is for a first TPM in the network device, and the second security certificate is for a second TPM in the network device.

* * * * *